Oct. 29, 1929.　　　R. MOORE　　　1,733,898
BRAKING ENGINE
Filed Sept. 10, 1927
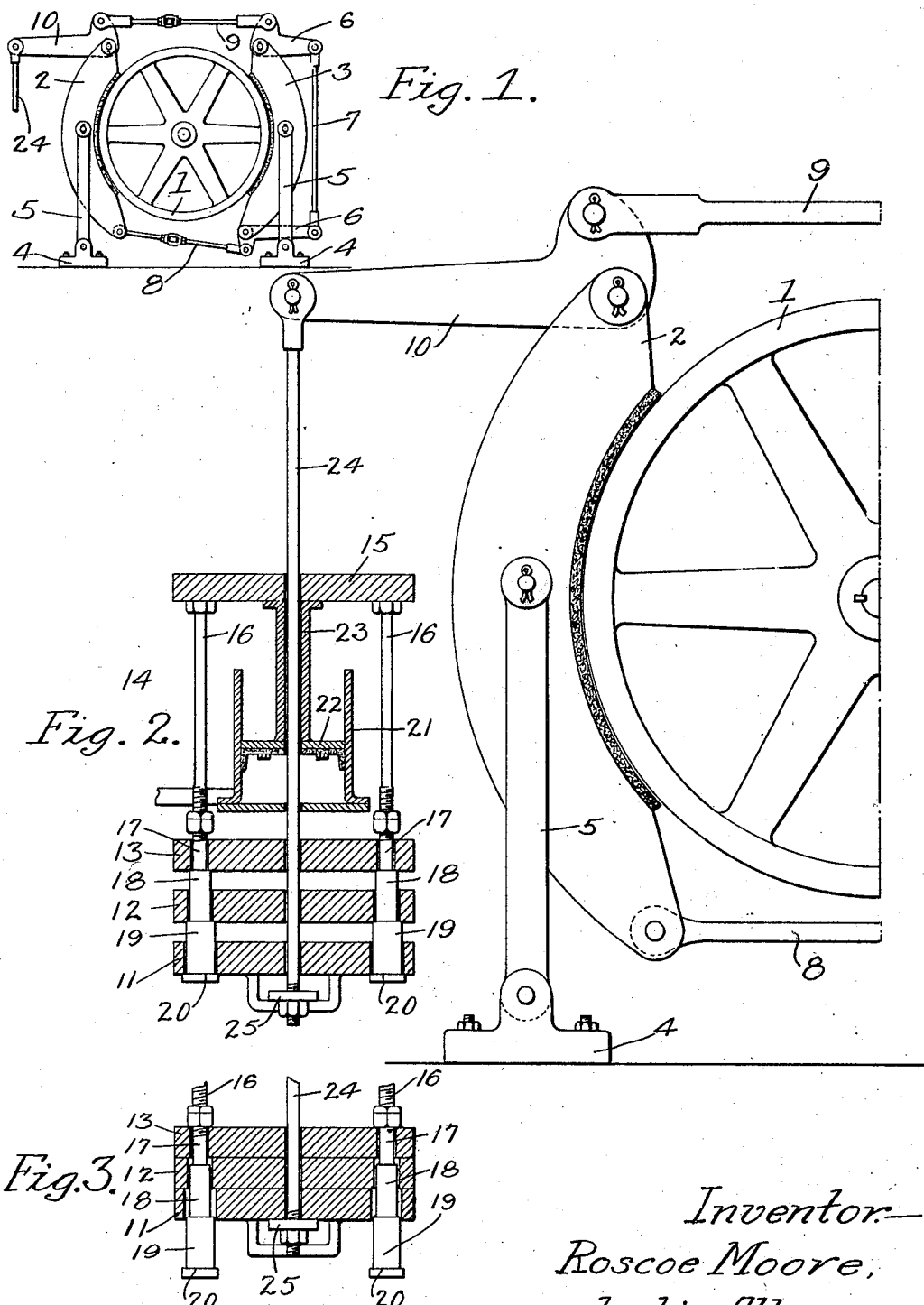
Inventor-
Roscoe Moore,
by his Attorneys,
Howson & Howson Patented Oct. 29, 1929

1,733,898

UNITED STATES PATENT OFFICE

ROSCOE MOORE, OF WILKES-BARRE, PENNSYLVANIA, ASSIGNOR TO VULCAN IRON WORKS, OF WILKES-BARRE, PENNSYLVANIA, A CORPORATION OF PENNSYLVANIA

BRAKING ENGINE

Application filed September 10, 1927. Serial No. 218,703.

This invention relates to improvements in braking engines of the type employing a nonelastic power source in the form, for example, of weights applied directly to the brakes and acting by gravity to force the brake shoes against the brake drum or other moving part. In this type of braking system, it is extremely difficult to so graduate the load applied to the brakes that the braking force between the shoes and the drum is other than the maximum or minimum, any intermediate braking force being very difficult to obtain.

It is the principal object of the present invention to provide a novel device whereby in braking systems of the aforesaid type the braking force may be graduated between the maximum and minimum. To this end, the invention consists of a novel device whereby a given load in the form of weights may be applied to force the brake shoe against the drum in predetermined increments, whereby the braking force may be regulated in accordance with the requirements of the moment.

In the attached drawings, I have illustrated a device made in accordance with my invention:

Figure 1 being a diagrammatic side elevation of a brake drum and brake shoe system to which the device is applicable;

Figure 2 being an enlarged fragmentary elevation partly in section of the device as applied to the brake shown in Fig. 1, and Fig. 3 being a fragmentary sectional view of the weight mechanism illustrating the operation of the device With reference to the drawings, 1 is a brake drum and 2 and 3 brake shoes which cooperate with the drum in well known manner. These brake shoes are supported in the present instance upon anchorages 4 through the medium of upright links 5 with which the shoes are pivotally connected and which are themselves pivotally connected with the anchorages 4.

The shoes are operatively connected by means of a system of connecting rods and bell crank levers with a power source, hereinafter described, whereby the shoes may either be drawn together against the opposite sides of the brake drum, or separated to release the drum. In the present instance, the brake shoe 3 has at both top and bottom a bell crank lever 6, which levers are connected together by a rod 7. The other arm of the lower lever is connected through a rod 8 with the bottom of the brake shoe 2, while the other arm of the bell crank lever at the top of the shoe 3 is connected through a rod 9 with an arm of a bell crank lever 10 pivotally connected at the top of the shoe 2, the other arm of the lever 10 being connected with the source of power referred to above.

The power source consists in the present instance of a series of weights 11, 12 and 13, which are normally supported, as shown in Fig. 2, in a yoke 14 consisting of a member 15 from which depend two or more rods 16, 16, which carry the said weights. The lower ends of the rods 16 have sections 17, 18 and 19 of increasing diameters, the section of greatest diameter being at the bottom and the section of least diameter at the top. The weights 11, 12 and 13 have openings therein to accommodate respectively the sections 19, 18 and 17 of the rods, and these openings correspond closely in diameter to the diameters of the sections of the rods which pass therethrough. Also the sections 17, 18 and 19 of the rods are of greater length than the thickness of the weights 11, 12 and 13, as clearly shown. Under normal circumstances and as shown in Fig. 2, the weight 11 will rest upon shoulders 20 at the lower ends of the section 19 of the rods, the weight 12 will rest upon the shoulder at the top of the section 19, while the weight 13 rests upon the shoulder at the top of the section 18.

Associated with the yoke 14 is a relatively fixed power cylinder 21, in which operates a piston 22. This piston is connected through a hollow piston rod 23 with the member 15 of the yoke 14. Extending in the present instance through the member 15, through the hollow connecting rod 23, and the piston 22, and through suitable apertures in the weights 11, 12 and 13, is a rod 24 which at the top connects with the bell crank lever 10 and which carries at the bottom a washer 25 which prevents the rod 24 from being withdrawn from the apertures in the weight 11.

With the foregoing arrangement of parts, pressure applied in the interior of the cylinder 21 will elevate the piston 22 and with it the yoke 14 and the weights 11, 12 and 13, the parts assuming the relative positions shown in Fig. 2. As the fluid is exhausted from the cylinder 21, the piston 22 with the yoke 14 and the weights carried thereby are permitted to move downwardly until the weight 11 meets the washer 25. Immediately the load due to this weight 11 is transferred from the yoke 14 to the rod 24, and the brake mechanism is actuated to bring the brake shoes 2 and 3 into contact with the brake 1. The braking force under these circumstances is due entirely to gravity acting through the weight 11. Continued downward movement of the piston 22 of the yoke 14 transfers the load of the weights 12 and 13, and finally of the yoke itself successively onto the rod 24, the force with which the shoes are applied to the drum being proportionate to the loads successively applied as described.

In Fig. 3, I have illustrated application of the entire load consisting of the weights 11, 12 and 13 and the yoke 14 including the piston 22 applied to the brake.

With the foregoing device, it will be apparent that the force with which the brakes are applied may be varied in predetermined steps or increments from zero to a maximum.

I claim:

In a brake system, the combination with a drum, of a shoe cooperative with the drum, means for applying the shoe to the drum including a plurality of adjustable weights, a movable yoke including weight-supporting arms having longitudinally adjoining parts of differing cross sectional area arranged in order of size with the larger sizes underneath, and said weights being apertured respectively to fit the said parts of differing cross sectional area whereby each of the weights may be individually supported on the top of the adjacent larger part of the said rods and whereby said weights may be successively transferred to or removed from the shoe-applying means when the yoke is moved vertically in opposite directions.

ROSCOE MOORE.